(12) United States Patent
Dolega et al.

(10) Patent No.: US 10,392,684 B2
(45) Date of Patent: *Aug. 27, 2019

(54) METHOD FOR THE PRODUCTION OF AN ANODISED, TURNED MECHANICAL PART MADE FROM 6XXX ALLOY AND HAVING LOW ROUGHNESS AFTER ANODISATION

(71) Applicant: CONSTELLIUM EXTRUSION DECIN S.R.O., Decin V (CZ)

(72) Inventors: Lukasz Dolega, Grenoble (FR); Jean-sylvestre Safrany, Voiron (FR); Ivo Kolarik, Decin (CZ)

(73) Assignee: CONSTELLIUM EXTRUSION DECIN S.R.O., Decub V (CZ)

( * ) Notice: Subject to any disclaimer, the term of this patent is extended or adjusted under 35 U.S.C. 154(b) by 269 days.

This patent is subject to a terminal disclaimer.

(21) Appl. No.: 15/127,517

(22) PCT Filed: Mar. 20, 2015

(86) PCT No.: PCT/EP2015/000613
§ 371 (c)(1),
(2) Date: Sep. 20, 2016

(87) PCT Pub. No.: WO2015/144302
PCT Pub. Date: Oct. 1, 2015

(65) Prior Publication Data
US 2017/0137922 A1     May 18, 2017

(30) Foreign Application Priority Data
Mar. 24, 2014  (FR) ...................... 14 00704

(51) Int. Cl.
| | |
|---|---|
| B21C 1/00 | (2006.01) |
| B22D 7/00 | (2006.01) |
| B23B 1/00 | (2006.01) |
| C22F 1/05 | (2006.01) |
| B21C 23/00 | (2006.01) |
| B22D 21/00 | (2006.01) |
| C22C 21/02 | (2006.01) |
| C22C 21/08 | (2006.01) |
| C22F 1/043 | (2006.01) |
| C22F 1/047 | (2006.01) |

(Continued)

(52) U.S. Cl.
CPC .............. *C22F 1/047* (2013.01); *B22D 7/005* (2013.01); *B22D 21/007* (2013.01); *C22C 21/02* (2013.01); *C22C 21/08* (2013.01); *C22F 1/043* (2013.01); *C22F 1/05* (2013.01); *C25D 11/04* (2013.01); *C25D 11/08* (2013.01); *C25D 11/10* (2013.01); *C25D 11/16* (2013.01); *B21C 1/003* (2013.01); *B21C 23/002* (2013.01); *B23B 1/00* (2013.01); *B23B 2222/04* (2013.01); *B23B 2228/10* (2013.01)

(58) Field of Classification Search
CPC . C22F 1/047; C22F 1/043; C22F 1/05; B22D 7/005; C22C 21/02; C22C 21/08; C25D 11/04; C25D 11/08; C25D 11/10; B21C 23/002; B23B 1/00; B23B 2222/04; B23B 2228/10

See application file for complete search history.

(56) References Cited

U.S. PATENT DOCUMENTS

| | | |
|---|---|---|
| 3,112,250 A | 11/1963 | Walker |
| 3,524,799 A | 8/1970 | Dale |

(Continued)

FOREIGN PATENT DOCUMENTS

| | | |
|---|---|---|
| EP | 1980651 A2 | 10/2008 |
| EP | 2664687 A1 | 11/2013 |

(Continued)

OTHER PUBLICATIONS

International Search Report dated Jul. 9, 2015, issued in counterpart International Application No. PCT/EP2015/000613.

(Continued)

*Primary Examiner* — C Melissa Koslow
(74) *Attorney, Agent, or Firm* — McBee Moore Woodward & Vanik IP, LLC

(57) ABSTRACT

The invention relates to a method for the production of a mechanical part, comprising the following successive steps: casting of a billet of aluminum alloy with a composition (in weight %) of 0.4-3.0 Si; 0.6-2.0 Mg; 0.20-1.0 Cu; 0.15-1.8 Fe; Mn<0.5; Ni<1; Ti<0.15; Cr<0.35; Bi<0.8; Pb<0.4; Zr<0.04; other elements <0.05 each and <0.15 total, the remainder being aluminum; homogenization of the billet; extrusion of the billet in order to obtain an extruded product; quenching while at extrusion heat; optional cold-deformation and/or straightening, typically by means of pulling and/or drawing, and/or curing of the extruded product; tempering; optional cold-deformation of the extruded product, typically by drawing; machining of the resulting extruded product in order to obtain a turned mechanical part; optional shaping of the resulting mechanical part; anodizing of the resulting mechanical part at a temperature of between 15 and 40 C with a solution comprising between 100 and 250 g/l sulphuric acid and between 10 and 30 g/l oxalic acid and between 5 and 30 g/l of at least one polyol. The anodized turned mechanical parts obtained using the method of the invention have, in particular, advantageous roughness and excellent corrosion resistance and can be used, in particular, as brake pistons or gearbox elements.

19 Claims, No Drawings

(51) Int. Cl.
*C25D 11/04* (2006.01)
*C25D 11/08* (2006.01)
*C25D 11/10* (2006.01)
*C25D 11/16* (2006.01)

(56) References Cited

U.S. PATENT DOCUMENTS 4,526,660 A * 7/1985 Garriga ................. C25D 11/06
 205/108
2018/0202026 A1* 7/2018 Dolega .................. C22C 21/08

FOREIGN PATENT DOCUMENTS

WO    WO 2008/112698    * 9/2008
WO    WO 2013/170953    * 11/2013

OTHER PUBLICATIONS

French Search Report received Jan. 26, 2015, issued in counterpart French Application No. FR 1400704.

* cited by examiner

METHOD FOR THE PRODUCTION OF AN ANODISED, TURNED MECHANICAL PART MADE FROM 6XXX ALLOY AND HAVING LOW ROUGHNESS AFTER ANODISATION

CROSS REFERENCE TO RELATED APPLICATIONS

This application is a § 371 National Stage Application of PCT/EP2015/000613, filed Mar. 20, 2015, which claims priority to French Application No. 14/00704, filed Mar. 24, 2014.

BACKGROUND

Field of the Invention

The invention refers to turned parts obtained from extruded bar or rod products made of aluminum alloy from the AA6xxx series, and particularly the production method thereof comprising machining and an anodization treatment.

Description of Related Art

Turning refers to a field of manufacturing involving the mass-production machining of mechanical parts, typically turned parts (screws, bolts, pins, pistons, etc.), by the removal of material from metal bars or rods.

In the case of aluminum alloys, these bars or rods are generally made by extrusion from billets.

In this way, the parts are made at high production rates on manually or numerically controlled cutting machines.

Productivity and surface condition, as well as the dimensional precision of the final part, are the primary objectives associated with this type of manufacturing. After machining, the parts may be given a protective surface treatment, typically anodization. So-called hard anodization, typically done at low temperature (0-5° C.) and a high current density in the presence of sulfuric acid, is capable of providing coatings that are highly resistant to abrasion.

Parts produced in this way find applications in various fields, from timepieces to medical equipment, not to mention the fields of transportation (aviation, rail, automobile) and industry (electrical, electronic, hydraulic, etc.). This type of application also prizes good corrosion resistance. Sealing is a known solution for improving the corrosion resistance of anodized parts.

Sealing consists in closing the pores of the oxide layer. It can be done hot or cold. When done hot, this operation is a partial thermo-hydration of the alumina, which crystallizes into alumina monohydrate (Boehmite) and closes the pores by swelling of the oxide. This is customarily done by immersion in deionized water at a minimum of 96° C. When done cold, typically at a temperature of 25-30° C., this operation is comparable to impregnation, which closes the pores by salt precipitation. It is done by immersion in a solution containing, for instance, nickel fluorides.

The drawback of sealing (either hot or cold), although easy to implement, is that it is an additional step in the process and it generally is not compatible with organic coatings.

There is an increasing demand for turned mechanical parts having both a low roughness after anodization and a coating resistant to abrasion and corrosion. In particular, for certain applications such as brake pistons or gearbox parts, decreasing the roughness while providing a resistant coating would improve contact between the mechanical part and its gasket and thus decrease wear and corrosion and extend the life of the parts. However, alloys that are well suited to turning generally contain numerous intermetallic phases which, during hard anodization, generate a substantial amount of roughness. It is therefore very difficult to obtain an extruded product that both lends itself well to turning and also has a low surface roughness after anodization.

International application WO 2005/100623 describes alloys, preferably in extruded form, that are suitable for turning and have a composition in wt % of Si 0.6-2.0; Fe 0.2-1.0; Mg 0.5-2.0, Cu max 1.0, Mn max 1.5, Zn max 1.0, Cr max 0.35, Ti max 0.35, and Zr 0.04-0.3.

International application WO 2007/027629 describes a press quenching method for alloy 6020. The resulting product is well suited to turning.

International application WO 2010/112698 describes an extruded product having an excellent aptitude for turning with a composition in wt % of Si 0.8-1.5; Fe 1.0-1.8; Cu<0.1-Mn<1; Mg 0.6-1.2; Ni<3.0; Cr<0.25-Ti<0.1.

International application WO 2013/170953 describes a product having a composition in wt % of Si 1.3-12; Fe 1.35-1.8, in which Fe+Si is greater than 3.4; Cu 0.15-6; Mg 0.6-3; Mn<1; Cr<0.25; Ni<3-Zn<1-Ti<0.1-Bi<0.7-In<0.7-Sn<0.7. After machining and anodization in order to obtain an oxide layer 30 μm thick, the lowest roughness value reached is 1.80 μm.

Anodization methods for making oxide layers, notably on 6xxx alloys, are known, for example U.S. Pat. No. 3,524,799 or EP application 1 980 651. The alloys tested in these documents, such as alloy 6063 or 6463, are not known to be suitable for turning.

The problem that the present invention is intended to solve is that of obtaining mechanical parts by turning which, after machining and anodization, have low roughness.

SUMMARY

A first subject matter of the invention is a method for producing a mechanical part through the following steps a. an aluminum alloy billet is cast having a composition in wt % of Si 0.4-3.0; Mg 0.6-2.0; Cu 0.20-1.0; Fe 0.15-1.8; Mn≤0.5; Ni≤1; Ti<0.15; Cr≤0.35; Bi≤0.8; Pb≤0.4; Zr<0.04, other elements <0.05 each and <0.15 total, balance aluminum, b. said billet is homogenized, c. said billet is extruded to obtain an extruded product, d. quenching is done while at extrusion heat, e. optionally, it is straightened and/or cold deformed, typically by traction and/or drawing, and/or said extruded product is naturally aged, f. artificial aging is performed, g. optionally, cold deforming is typically done by drawing said extruded product h. the extruded product thus obtained is machined to make a turned mechanical part, i. optionally, the mechanical part thus obtained is shaped j. the resulting mechanical part is anodized, said anodization being performed at a temperature of between 15 and 40° C. with a solution comprising 100 to 250 g/l sulfuric acid and 10 to 30 g/l oxalic acid, and 5 to 30 g/l of at least one polyhydric alcohol.

A second subject matter of the invention is a turned and anodized mechanical part made by the method of the invention.

DETAILED DESCRIPTION OF A PREFERRED EMBODIMENT

Unless stated otherwise, all indications concerning the chemical composition of alloys are expressed as a percentage by weight based on the total weight of the alloy. The expression 1.4 Cu means that the copper content expressed in wt % is multiplied by 1.4. The alloy designations are made in compliance with the rules of the Aluminum Association, which are known to a person skilled in the art. Unless indicated otherwise, the definitions of standard EN 12258-1 apply. Unless indicated otherwise, the metallurgical temper definitions of standard EN 515 apply.

Unless indicated otherwise, the static mechanical specifications—in other words the ultimate strength Rm, conventional elastic limit at 0.2% elongation Rp0.2, and elongation at break A %—are determined by a tensile test according to standard ISO 6892-1, with the sample and direction of the test being defined by standard EN 485-1.

The turning capability is evaluated by a machining test as described in international application WO2013/170953 in paragraph [0039]. The test consists in determining the fragmentation ability of chips by measuring the number of chips in a given mass of collected chips, 100 g in the present case. The machining is done using an SP 12 CNC lathe and a rhombic insert with a basic shape of 80° sold under the registered trademark SANDVIK Coromant Coroturn® 107 as item CCGX 09 T3 04-AL, designed for aluminum alloys. The machining parameters used are a rotational speed of 3150 rpm, a feed of 0.3 mm/revolution, and a cutting depth of 3.5 mm. The extruded products of the invention are suitable for turning, that is, when subjected to the test described in international application WO2013/170953, paragraph [0039], they yield a number of chips for 100 g of chips of at least 3000 and preferably at least 4000.

Three roughness parameters measured according to standard ISO 4287 are used:

$R_{max}$: maximum height of the roughness profile, i.e. the largest of the $R_{zi}$ values over the evaluation length $R_z$: Average height of the $R_z$ profile, i.e. the arithmetic mean of the individual $R_{zi}$ values over the evaluation length $R_a$: Mean roughness deviation, i.e. the arithmetic mean of all the ordinates of the profile over the evaluation length.

In the context of this invention, a granular structure such that the rate of recrystallization at ¼ thickness is greater than 70% and preferably greater than 90%, is called an essentially recrystallized granular structure. The recrystallization rate is defined as the surface fraction of a metallographic section occupied by recrystallized grains.

The present inventors have observed that for known turning alloys, such as alloys AA6262, AA6064A, or AA6042, or the alloy described in international application WO2013/170953, the roughness after anodization making it possible to obtain an oxide layer at least 20 µm thick is much higher than the roughness before anodization. Typically, even if a roughness such that $R_z$<0.01 µm is obtained after machining, the roughness after anodization is at least 1.80 µm or more. Consequently, the presence of numerous intermetallic compounds in this type of alloy generates substantial roughness during anodization.

The present inventors have observed that this problem is solved by using a specific anodization method. In addition, by combining this specific anodization method with certain alloy compositions and/or the granular structure of the extruded products, very low roughness can be achieved in certain cases.

In the method according to the invention, an aluminum alloy billet is cast having a composition in wt % of Si 0.4-3.0; Mg 0.6-2.0; Cu 0.20-1.0; Fe 0.15-1.8; Mn≤0.5; Ni≤1; Ti<0.15; Cr≤0.15; Bi≤0.8; Pb≤0.4; Zr<0.04, other elements <0.05 each and <0.15 total, balance aluminum.

The simultaneous minimum values of silicon, magnesium, copper, and iron make it possible, in particular, to obtain extruded products especially well-suited to turning. Preferably, the iron content is at least 0.20 wt % and/or the copper content is at least 0.23 wt %. Alloys not having these minimum values, such as alloys 6063 or 6463, are not suitable for turning.

The billet is homogenized. Advantageously, a homogenization is performed at a temperature of at least 480° C. The billet is then extruded to obtain an extruded product, and then quenched while at extrusion heat. Optionally, it is straightened and/or cold deformed, typically by traction and/or drawing, and/or said extruded product is naturally aged. Any natural ageing is typically for a few hours to a few days. The extruded product is then age treated. Advantageously, the aging treatment is performed at a temperature of between 150 and 200° C. and preferably between 170 and 190° C. for a period of between 5 and 25 hours and preferably between 8 and 15 hours. It is possible after aging treatment to perform cold deforming, typically by drawing, so as to obtain a T9 temper.

The resulting extruded product is then machined to obtain a turned mechanical part. Advantageously, said machining is done by turning in order to obtain a turned mechanical part.

Optionally, the mechanical part thus obtained is shaped.

The resulting mechanical part is then anodized at a temperature of between 15 and 40° C. with a solution comprising 100 to 250 g/l sulfuric acid and 10 to 30 g/l oxalic acid, and 5 to 30 g/l of at least one polyhydric alcohol. Advantageously, at least one polyhydric alcohol is chosen from ethylene glycol, propylene glycol, or glycerol. The anodization is done with a current density of between 1 and 5 A/dm², preferably between 1 and 3 A/dm². Advantageously, the resulting anodic oxide layer thickness is between 20 and 40 µm. Preferably, the anodization temperature is between 25 and 35° C. The present inventors have indeed observed that, surprisingly, an anodization temperature of about 30° C. further reduces the roughness of the parts after anodization.

In an advantageous embodiment, no sealing is done after the anodization step. Indeed, with the method of the invention it is possible to obtain adequate corrosion resistance for non-sealed anodized products.

In a first advantageous embodiment of the invention, the extruded products have an essentially recrystallized structure and are made with an alloy having a composition in wt % of Si 0.4-0.8; Mg 0.8-1.2; Cu 0.23-0.4; Fe 0.2-0.4; Mn≤0.10; Ni≤0.05; Ti<0.15; Cr≤0.10; Bi≤0.8; Pb≤0.4; other elements <0.05 each and <0.15 total, balance aluminum. Preferably, the copper content in this first embodiment is at least 0.24 wt %. Advantageously, in this first embodiment the composition is such that, in wt %, Bi 0.4-0.8 and Pb 0.2-0.4 and preferably Pb 0.2-0.34. The present inventors have observed that, surprisingly, an essentially recrystallized extruded product made of an alloy according to the first embodiment has, after mirror polishing and anodization to obtain an oxide layer at least 20 µm thick, a roughness Rz on a generatrix parallel to the extrusion axis equal to or less than 1.7 µm and preferably less than 1.2 µm. The essentially recrystallized structure is obtained, notably, by controlling the manganese content and the chromium content. Preferably, the manganese content is at most 0.05 wt %. Preferably, the chromium content is at most 0.08 wt %. Advantageously, the sum of the chromium and manganese content is such that, in wt %, Cr+Mn≤0.15 and preferably Cr+Mn≤0.10. Controlling the zirconium content can also be important for obtaining the essentially recrystallized structure. Advantageously, the zirconium content is less than 0.04 wt % and preferably less than 0.03 wt %.

In a second advantageous embodiment of the invention, the extruded products have a non-recrystallized structure and are made of an alloy having a composition in wt % of Si 1.3-3.0; Fe 1.35-1.8; Cu 0.25-1.0; Mg 0.6-2; Mn<0.5; Cr<0.15; Ni 0.6-1.0-Ti<0.10-Bi<0.7. other elements <0.05 each and <0.15 total, balance aluminum. Advantageously, Fe+Si is greater than 3.2 wt %. Preferably, the Bi content and/or the Ti content are less than 0.05 wt %. Using an anodization temperature of between 25 and 35° C. is particularly advantageous in the second embodiment.

The turned and anodized mechanical parts obtained by the method of the invention are advantageous, particularly because they have a lower roughness than mechanical parts made by the method of the prior art.

Preferably, they have a roughness Rz on a generatrix parallel to the extrusion axis that is at least 10% lower and preferably at least 15% lower than the roughness Rz obtained on an anodized mechanical part having the same composition, the same metallurgical structure, the same shape, and having an anodic oxide layer of the same thickness, but made at a temperature of 5° C. with a solution containing 200 g/l sulfuric acid, with a current density of 3 $A/dm^2$.

For the mechanical parts obtained according to the method of the first preferred embodiment, the mechanical parts according to the invention advantageously have a roughness Rz on a generatrix parallel to the extrusion axis of less than 1.7 μm and preferably less than 1.2 μm.

For the mechanical parts obtained according to the method of the second preferred embodiment, the mechanical parts according to the invention advantageously have a roughness Rz on a generatrix parallel to the extrusion axis of less than 1.7 μm.

Advantageously, the turned and anodized mechanical parts according to the invention are brake pistons or gearbox parts.

The mechanical parts obtained according to the invention and which do not undergo sealing have excellent corrosion resistance. After exposure to a neutral salt spray according to standard EN ISO 9227 for 16 hours, advantageously 48 hours, or more preferably 96 hours, these parts do not show any corrosion, that is, pursuant to standard NF EN ISO 10289, the protection rating of the part is 10.

Examples

Example 1

In this example, two alloys having the composition specified in Table 1 were prepared.

TABLE 1

| | Composition of the alloys (wt %) | | | | | | | | |
|---|---|---|---|---|---|---|---|---|---|
| | Si | Fe | Cu | Mn | Mg | Cr | Ti | Ni | Pb | Bi |
| A | 0.7 | 0.35 | 0.36 | 0.12 | 1.0 | 0.21 | 0.04 | 0.01 | <0.01 | <0.01 |
| B | 0.7 | 0.41 | 0.31 | 0.11 | 1.1 | 0.12 | 0.02 | 0.03 | 0.38 | 0.7 |

The alloys were cast in the form of billets, which were homogenized and then extruded in the form of cylindrical bars measuring 30 mm in diameter (alloy A) or 18 mm in diameter (alloy B), then quenched upon exiting the press. The resulting bars were stretched to 1% and then subjected to artificial aging to achieve a T6 temper. The resulting bars had a non-recrystallized granular structure.

Milling of the bars by about 10 mm was done to obtain a flat surface to which the following preparation treatments were applied: mirror polishing then anodization according to method (1) or method (2) described in Table 2.

TABLE 2

| | Description of anodization methods 1 and 2 | | | | |
|---|---|---|---|---|---|
| Method | Pretreatment before anodization | Anodization electrolyte | Current density ($A/dm^2$) | Temperature (° C.) | Oxide thickness (μm) |
| 1 | Degreasing with NOVACLEAN D708 alkaline cleaner | 200 g/l $H_2SO_4$ | 3 | 5 | 30 |
| 2 | Degreasing with NOVACLEAN D708 alkaline cleaner | 180 g/l $H_2SO_4$ + 14 g/l oxalic acid + 15 g/l glycerol | 2 | 20 | 30 |

The roughness results are shown in Table 3.

TABLE 3

| | Results of roughness measurements after anodization treatment. | | | |
|---|---|---|---|---|
| Alloy | Anodization method | Mean Ra (μm) | Average Rz (μm) | Average Rmax (μm) |
| A | 1 | 0.43 | 2.46 | 3.31 |
| A | 2 | 0.28 | 2.00 | 2.48 |
| B | 1 | 0.43 | 2.68 | 3.27 |
| B | 2 | 0.31 | 2.28 | 2.84 |

Example 2

In this example, an alloy having the composition specified in Table 4 was prepared.

TABLE 4

| | Composition of the alloy (wt %) | | | | | | | | | |
|---|---|---|---|---|---|---|---|---|---|---|
| | Si | Fe | Cu | Mn | Mg | Cr | Ti | Zr | Ni | Pb | Bi |
| C | 0.6 | 0.26 | 0.24 | 0.03 | 1.1 | 0.05 | 0.02 | <0.01 | <0.01 | 0.25 | 0.5 |

The alloy was cast in the form of a billet measuring 254 mm in diameter, homogenized at 585° C., then extruded in the form of a bar with a 15×100 mm cross-section, the initial extrusion temperature being 530° C. and the extrusion rate being approximately 10 m/min, then quenched upon exiting the press. The resulting bar was stretched to 1% and then subjected to artificial aging to achieve a T6 temper.

The resulting bar of alloy C had a recrystallized structure at one quarter thickness. The bar then underwent the following preparation treatments: 2 mm machining, mirror polishing, then anodization according to method (1) or method (3) described in Table 5.

TABLE 5

Description of anodization methods 1 and 3

| Method | Pretreatment before anodization | Anodization electrolyte | Current density (A/dm²) | Temperature (° C.) | Oxide thickness (μm) |
|---|---|---|---|---|---|
| 1 | Degreasing with NOVACLEAN D708 alkaline cleaner | 200 g/l H₂SO₄ | 3 | 5 | 30 |
| 3 | Degreasing with NOVACLEAN D708 alkaline cleaner | 180 g/l H₂SO₄ + 14 g/l oxalic acid + 15 g/l glycerol | 2 | 30 | 30 |

The roughness results are shown in Table 6.

TABLE 6

Results of roughness measurements after anodization treatment.

| Alloy | Anodization method | Mean Ra (μm) | Average Rz (μm) | Average Rmax (μm) |
|---|---|---|---|---|
| C | 1 | 0.35 | 2.33 | 3.28 |
| C | 3 | 0.09 | 0.95 | 1.78 |

Example 3

In this example, an alloy having the composition specified in Table 7 was prepared.

TABLE 7

Composition of the alloy (wt %)

| Alloy | Si | Fe | Cu | Mn | Mg | Cr | Ni |
|---|---|---|---|---|---|---|---|
| D | 1.9 | 1.4 | 0.35 | 0.38 | 0.78 | 0.1 | 0.81 |

The alloy was cast in the form of a billet measuring 296 mm in diameter, homogenized, then extruded in the form of a bar and quenched upon exiting the press. The resulting bar was drawn in order to obtain a bar with a diameter of 27.8 mm, then subjected to artificial aging for 10 hours at 160° C.

The resulting bar of alloy D had a non-recrystallized structure at one quarter thickness.

Milling of approximately 10 mm of the bar was done to obtain a flat surface to which the following preparation treatments were applied: mirror polishing then anodization according to method (4) or method (5) described in Table 8.

TABLE 8

Description of anodization methods 4 and 5

| Method | Pretreatment before anodization | Anodization electrolyte | Current density (A/dm²) | Temperature (° C.) | Oxide thickness (μm) |
|---|---|---|---|---|---|
| 4 | Degreasing with NOVACLEAN D708 alkaline cleaner | 180 g/l H₂SO₄ + 14 g/l oxalic acid + 15 g/l glycerol | 1 | 20 | 20 |
| 5 | Degreasing with NOVACLEAN D708 alkaline cleaner | 180 g/l H₂SO₄ + 14 g/l oxalic acid + 15 g/l glycerol | 1 | 30 | 20 |

The roughness results are shown in Table 9

TABLE 9

Results of roughness measurements after anodization treatment.

| Alloy | Anodization method | Thickness of the anodic layer (μm) | Mean Ra (μm) | Average Rz (μm) | Average Rmax (μm) |
|---|---|---|---|---|---|
| D | 4 | 20 | 0.37 | 2.4 | 3.0 |
|   | 5 | 20 | 0.25 | 1.7 | 2.1 |

Example 5

In this example, two alloys having the composition specified in Table 10 were prepared.

TABLE 10 composition of the alloys (wt %)

|   | Si | Fe | Cu | Mn | Mg | Cr | Ti | Zr | Ni | Pb | Bi |
|---|---|---|---|---|---|---|---|---|---|---|---|
| C | 0.6 | 0.26 | 0.24 | 0.03 | 1.1 | 0.05 | 0.02 | <0.01 | <0.01 | 0.25 | 0.5 |
| I | 0.7 | 0.4 | 0.3 | 0.11 | 1 | 0.11 | 0.02 | <0.01 | <0.01 | 0.38 | 0.67 |

The alloys were cast in the form of billets, homogenized at 585° C., then extruded in the form of a bar with a 15×100 mm cross-section. The two products were quenched upon exiting the press. The resulting bars were stretched to 1% and then subjected to artificial aging to achieve a T6 temper.

The resulting bar of alloy C had a recrystallized structure at one quarter thickness. The bar of alloy I had a non-recrystallized structure at one quarter thickness.

The bars then underwent the following preparation treatments: machining of 2 mm, mirror polishing, then anodization according to method (1) or method (3), the conditions of which are described in Table 11 below. After anodization, the samples either underwent a sealing process or not. The sealing was done at 30° C. in an aqueous solution of 5 g/l of Anodal CS 3 A for 20 minutes. Anodal CS-3A is a commercial product for cold sealing supplied by Omya. It essentially contains nickel fluoride and some additives.

To differentiate the cases of the example, we will note the anodization processes without sealing as method (1) or method (3) and the anodization processes with sealing as method (1 sealed) or method (3 sealed). See Table 11, which describes the conditions used.

TABLE 11

Description of anodization methods 1, 1 sealed, 3, and 3 sealed.

| Method | Pretreatment before anodization | Anodization electrolyte | Current density (A/dm$^2$) | Temperature (° C.) | Oxide thickness (μm) | Sealing electrolyte | Temperature (° C.) | Time in min |
|---|---|---|---|---|---|---|---|---|
| 1 | Degreasing with NOVACLEAN D708 alkaline cleaner | 200 g/l H$_2$SO$_4$ | 3 | 5 | 30 | — | — | — |
| 1 sealed | Degreasing with NOVACLEAN D708 alkaline cleaner | 200 g/l H$_2$SO$_4$ | 3 | 5 | 30 | 5 g/l Anodal CS-3A | 30 | 20 |
| 3 | Degreasing with NOVACLEAN D708 alkaline cleaner | 180 g/l H$_2$SO$_4$ + 14 g/l oxalic acid + 15 g/l glycerol | 2 | 30 | 30 | — | — | — |
| 3 sealed | Degreasing with NOVACLEAN D708 alkaline cleaner | 180 g/l H$_2$SO$_4$ + 14 g/l oxalic acid + 15 g/l glycerol | 2 | 30 | 30 | 5 g/l Anodal CS-3A | 30 | 20 |

After these surface treatments, the samples were subjected to a corrosion test to assess the corrosion resistance provided by the anodization. The test consisted in exposing the samples to a neutral salt spray according to standard EN ISO 9227 and tracking the change in corrosion as a function of exposure time (between 0 and 96 hours of exposure to the neutral salt spray). The corrosion resistance was assessed as a function of the percentage of surface area affected by corrosion according to standard NF EN ISO 10289 (see Table 13).

To each tested case is assigned a protection rating ($R_p$) defined by $R_p = 3(2 - \log_{10} A)$, where A is the percentage of total area showing corrosion of the base metal and $R_p$ is the protection rating number rounded to the closest whole number, which results in the values indicated in Table 12 below. A rating of 10 corresponds to a non-corroded product.

TABLE 12

Protection rating Rp according to standard NF EN ISO 10289

| Surface area having flaws A (%) | Rating $R_p$ |
|---|---|
| No flaw | 10 |
| 0 < A ≤ 0.1 | 9 |
| 0.1 < A ≤ 0.25 | 8 |
| 0.25 < A ≤ 0.5 | 7 |
| 0.5 < A ≤ 1.0 | 6 |
| 1.0 < A ≤ 2.5 | 5 |
| 2.5 < A ≤ 5.0 | 4 |
| 5.0 < A ≤ 10 | 3 |
| 10 < A ≤ 25 | 2 |
| 25 < A ≤ 50 | 1 |
| 50 < A | 0 |

TABLE 13

Resistance of anodized materials to corrosion (sealed or not sealed): protection rating defined by standard NF EN ISO 10289 after various periods of exposure to neutral salt spray according to standard EN ISO 9227.

| No. | Alloy | Method | Protection rating obtained after various periods of exposure to neutral salt spray | | |
|---|---|---|---|---|---|
| | | | 16 h | 48 h | 96 h |
| 1 | C | Method 1 | 9 | 9 | 9 |
| 2 | C | Method 3 | 10 | 10 | 10 |
| 3 | C | Method 3 sealed | 10 | 10 | 10 |
| 4 | I | Method 1 | 9 | 9 | 9 |
| 5 | I | Method 1 sealed | 10 | 10 | 10 |

If we compare cases 1 and 2 consisting of the same alloy C recrystallized and anodized according to method 1 or 3, we find that anodization method 3 achieves a better corrosion resistance compared to method 1. Case 2 does not show any corrosion after 96 hours of salt spray.

If we compare cases 1, 2, 4, and 5, we find that corrosion resistance comparable to method 3 is obtained with method 1 sealed.

The invention claimed is:

1. Method for producing a mechanical part comprising
a. an aluminum alloy billet is cast having a composition in wt % of Si 0.4-3.0; Mg 0.6-2.0; Cu 0.20-1.0; Fe 0.15-1.8; Mn≤0.5; Ni≤1; Ti<0.15; Cr≤0.35; Bi≤0.8; Pb≤0.4; Zr<0.04, other elements <0.05 each and <0.15 total, balance aluminum,
b. said billet is homogenized,
c. said billet is extruded to obtain an extruded product,
d. quenching is done while at extrusion heat,
e. artificial aging is performed,
f. the extruded product thus obtained is machined to make a turned mechanical part,
g. the resulting mechanical part is anodized, said anodization being performed at a temperature of between 15 and 40° C. with a solution consisting of 100 to 250 g/l sulfuric acid and 10 to 30 g/l oxalic acid, and 5 to 30 g/l of at least one polyhydric alcohol, and with a current density of between 1 and 5 A/dm$^2$,
wherein the at least one polyhydric alcohol is selected from the group consisting of ethylene glycol, propylene glycol, and glycerol.

2. Method according to claim 1, wherein the anodization is done with a current density of between 1 and 3 A/dm$^2$.

3. Method according to claim 1 in which the thickness of the resulting anodic oxide layer is between 20 and 40 μm.

4. Method according to claim 1 in which said anodization temperature is between 25 and 35° C.

5. Method according to claim 1 in which said machining is performed by turning in order to obtain a turned mechanical part.

6. Method according to claim 1 in which said extruded product has a non-recrystallized structure and is made of an alloy having a composition in wt % of Si 1.3-3.0; Fe 1.35-1.8; Cu 0.25-1.0; Mg 0.6-2; Mn<0.5; Cr<0.15; Ni 0.6-1.0-Ti<0.10-Bi<0.7.

7. Method according to claim 1, wherein no sealing is applied upon completion of the anodization.

8. Turned and anodized mechanical part obtained by the method of claim 1, wherein said mechanical part has a roughness Rz on a generatrix parallel to the extrusion axis that is at least 10% lower than the roughness Rz obtained on an anodized mechanical part having the same composition, the same metallurgical structure, the same shape, and having an anodic oxide layer of the same thickness made at a temperature of 5° C. with a solution containing 200 g/l sulfuric acid with a current density of 3 A/dm$^2$.

9. Mechanical part according to claim 8, wherein the composition thereof in wt % is Si 1.3-3.0; Fe 1.35-1.8; Cu 0.25-1.0; Mg 0.6-2; Mn<0.5; Cr<0.15; Ni 0.6-1.0-Ti<0.10-Bi<0.7, other elements <0.05 each and <0.15 total, balance aluminum, and in that the mechanical part has a roughness Rz on a generatrix parallel to the extrusion axis of less than 1.7 μm.

10. Mechanical part according to claim 8, wherein the mechanical part is made by no sealing being applied upon completion of anodization and, after exposure to neutral salt spray according to standard EN ISO 9227 for a period of 16 hours, the part does not show any corrosion.

11. Mechanical part according to claim 10, wherein after exposure to neutral salt spray according to standard EN ISO 9227 for a period of 48 hours, the part does not show any corrosion.

12. Mechanical part according to claim 10, wherein after exposure to neutral salt spray according to standard EN ISO 9227 for a period of 92 hours, the part does not show any corrosion.

13. Mechanical part according to claim 10, wherein the level of corrosion is in the range corresponding to a protection rating of the part being 10, according to standard NF EN ISO 10289.

14. Mechanical part according to claim 8, wherein the part is a brake piston or a gearbox.

15. Mechanical part according to claim 8, wherein said mechanical part has a roughness Rz on a generatrix parallel to the extrusion axis that is at least 15% lower than the roughness Rz obtained on an anodized mechanical part having the same composition, the same metallurgical structure, the same shape, and having an anodic oxide layer of the same thickness made at a temperature of 5° C. with a solution containing 200 g/l sulfuric acid with a current density of 3 A/dm$^2$.

16. A method for producing a mechanical part comprising
a. an aluminum alloy billet is cast having a composition in wt % of Si 0.4-0.8; Mg 0.8-1.2; Cu 0.23-0.4; Fe 0.2-0.4; Mn≤0.10; Ni≤0.05; Ti<0.15; Cr≤0.10; Bi≤0.8; Pb≤0.4;
other elements <0.05 each and <0.15 total, balance aluminum,
b. said billet is homogenized,
c. said billet is extruded to obtain an extruded product,
d. quenching is done while at extrusion heat,
e. artificial aging is performed,
f. the extruded product thus obtained is machined to make a turned mechanical part,
g. the resulting mechanical part is anodized, said anodization being performed at a temperature of between 15 and 40° C. with a solution comprising 100 to 250 g/l sulfuric acid and 10 to 30 g/l oxalic acid, and 5 to 30 g/l of at least one polyhydric alcohol, and with a current density of between 1 and 5 A/dm$^2$,
wherein said extruded product has a recrystallized structure.

17. Turned and anodized mechanical part obtained by a method comprising a. an aluminum alloy billet is cast having a composition in wt % of Si 0.4-0.8; Mg 0.8-1.2; Cu 0.25-0.4; Fe 0.05-0.4; Mn≤0.10; Ni≤0.05; Ti<0.15; Cr≤0.10; Bi≤0.8; Pb≤0.4; other elements <0.05 each and <0.15 total, balance aluminum,
b. said billet is homogenized,
c. said billet is extruded to obtain an extruded product,
d. quenching is done while at extrusion heat,
e. artificial aging is performed,
f. the extruded product thus obtained is machined to make a turned mechanical part,
g. the resulting mechanical part is anodized, said anodization being performed at a temperature of between 15 and 40° C. with a solution comprising 100 to 250 g/l sulfuric acid and 10 to 30 g/l oxalic acid, and 5 to 30 g/l of at least one polyhydric alcohol, and with a current density of between 1 and 5 $A/dm^2$,
wherein the structure thereof is essentially recrystallized, and said mechanical part has a roughness Rz on a generatrix parallel to the extrusion axis that is less than 1.7 μm.

18. Mechanical part according to claim 17, wherein said mechanical part has a roughness Rz on a generatrix parallel to the extrusion axis that is less than 1.2 μm.

19. A method for producing a mechanical part comprising
a. an aluminum alloy billet is cast having a composition in wt % of Si 0.4-3.0; Mg 0.6-2.0; Cu 0.20-1.0; Fe 0.15-1.8; Mn≤0.5; Ni≤1; Ti<0.15; Cr≤0.35; Bi≤0.8; Pb≤0.4; Zr<0.04, other elements <0.05 each and <0.15 total, balance aluminum,
b. said billet is homogenized,
c. said billet is extruded to obtain an extruded product,
d. quenching is done while at extrusion heat,
e. artificial aging is performed,
f. the extruded product thus obtained is machined to make a turned mechanical part,
g. the resulting mechanical part is anodized, said anodization being performed at a temperature of between 15 and 40° C. with a solution comprising 100 to 250 g/l sulfuric acid and 10 to 30 g/l oxalic acid, and 5 to 30 g/l of at least one polyhydric alcohol, and with a current density of between 1 and 5 $A/dm^2$,
wherein the at least one polyhydric alcohol is selected from the group consisting of ethylene glycol, propylene glycol, and glycerol,
wherein after the quenching step, said extruded product is straightened and/or cold deformed, and/or said extruded product is naturally aged,
and after the artificial aging step, cold deforming by drawing is done to said extruded product.

* * * * *